United States Patent
Slack et al.

[15] 3,703,861
[45] Nov. 28, 1972

[54] RAW ORGANIC MATERIAL COOKER

[72] Inventors: Vaughn H. Slack, Wingham, Ontario; Gilliaan Peter Koens, Missisauga, Ontario, both of Canada

[73] Assignee: Farm Automatic Feeding Limited, Gorrie, Ontario, Canada

[22] Filed: June 25, 1971

[21] Appl. No.: 156,815

[52] U.S. Cl. ...................... 99/443, 34/164, 219/388, 219/400, 219/411, 263/21
[51] Int. Cl. .............................................. A23k 1/00
[58] Field of Search ....219/214, 388, 400, 411; 99/2, 99/81, 235 A, 235 R, 245, 360, 443 C, 238.1-238.5; 34/164; 263/21

[56] References Cited

UNITED STATES PATENTS

| | | |
|---|---|---|
| 2,428,090 | 9/1947 | Naeher et al. ................99/217 |
| 3,433,468 | 3/1969 | Schoenlaub..................263/21 |
| 1,839,671 | 1/1932 | Hale..........................99/238.1 |
| 2,592,231 | 4/1952 | Allstott....................99/238 A |
| 3,112,186 | 11/1963 | Davis et al. ...............34/164 X |
| 3,143,428 | 8/1964 | Reimers..............99/235 R X |
| 3,173,794 | 3/1965 | Recleon.........................99/81 |
| 3,180,247 | 4/1965 | Hill............................99/238.5 |
| 3,263,339 | 8/1966 | Brown et al. ...................34/57 |
| 3,343,961 | 9/1967 | Truax...................99/235 R X |
| 3,412,477 | 11/1968 | Kayatz........................34/164 |

Primary Examiner—Volodymyr Y. Mayewsky
Attorney—Lawrence I. Field

[57] ABSTRACT

An apparatus for heat treating particulated organic material consisting of a preheating chamber, a roasting chamber operatively connected to the heating chamber, and a cooling chamber operatively connected to the roasting chamber; the preheating chamber having a hot air inlet, a preheating container in communication with the hot air inlet, a material inlet to the container and a material outlet from the container; the roasting chamber having a vibratory tray and heating elements above the tray such that the preheated material can flow along the tray while being roasted; and the cooling chamber having a trough which collects roasted material from the roasting chamber and transports it to an outlet, and a cool air inlet and warm air outlet for passing air around the roasted material.

8 Claims, 4 Drawing Figures

PATENTED NOV 28 1972 3,703,861

TO STORAGE

RAW ORGANIC MATERIAL COOKER

FIELD OF THE INVENTION

This invention relates to a method and an apparatus for heat treating particulated organic material and more particularly relates to the cooking of soybeans to improve the edibility and palatability thereof.

Raw soybeans have limited nutritional food value, but when properly roasted have high nutritional value. Roasted soybeans are a well balanced source of nutrients for both humans and animals, the amino acid concentration of soybean proteins being of a particularly high value comparing favorably with animal sources of protein.

However, the extent of use of soybeans in human foods, animal feeds and the like is extremely low even though soybeans are readily available and of low cost. This anomaly is caused by the existence of certain substances in raw soybeans. One of these substances causes limiting of the production of trypsin which is a proteolytic enzyme in the pancreatic juice which digests proteins, while another of these substances affects the production of hemagglutinin which causes clumping of red blood corpuscles. These substances can be modified or destroyed by the application of heat, however the amount of heat applied to the soybeans must be such that it is adequate to destroy only these substances without affecting the nutritional value of the soybeans. Furthermore, palatability of the soybeans will also be reduced by overheating and charring.

A heat balance analysis was made for the heat absorption requirement per pound of raw full-fat soybeans to provide optimum nutritional value in the roasted product. This analysis was made by the University of Guelph in Guelph, Ontario, Canada who made nutritional studies on chickens and found that the greatest nutritional value was obtained with an optimum heat absorbability of 195 B.t.u.'s per pound of soybeans. During the studies, it became evident that the greatest nutritional value was retained in the soybeans when the amount of heat absorbed was only slightly below the amount of heat which caused overheating of the soybeans. Therefore there is a requirement for a method and apparatus which can be used to roast soybeans under closely controlled heat conditions to obtain a product having a high nutritional value.

The economic advantages of using roasted soybeans for feed has been well substantiated by research. For instance, the Ontario Department of Agriculture and Feed Information Leaflet titled "Heat Processing of Soybeans for Swine," states that the digestable energy content of roasted soybeans is approximately 6 percent greater than that of soybean meal. Soybean meal is presently added to feed to provide a protein supplement, the high protein soybean meal being the meal which remains after extracting oil from soybeans. This soybean meal was primarily a by-product which could be fed to poultry and livestock. The use of roasted soybeans preparing livestock feed therefore leads to the formation of livestock feed having a greater nutritional value than that utilizing soybean meal.

DESCRIPTION OF PRIOR ART

Various types of soybean roasters are presently in use, a typical one being disclosed in U.S. Pat. No. 3,368,475 which issued on Feb. 13, 1968, to H. Truax, however this roaster, because of its construction, cannot operate to the close tolerance heating requirements which are necessary to produce high nutritional value roasted soybeans.

SUMMARY OF THE INVENTION

In this invention, the farmer stores his crop of soybeans on the farm in containers which usually are subjected to seasonal climatic temperature changes which can range from approximately 110°F. to −40°F. On entering the apparatus, the soybeans are preheated to approximately 140°F. The preheated soybeans are then fed onto a vibratory sloping tray and heated to approximately 240°F. utilizing an infrared radiation heat source which is preferably electrically operated. The soybeans are rotated on a vibratory tray so that even roasting of every soybean takes place. If required, cooling air can then be passed around the hot roasted soybeans which are placed into storage for later use.

The apparatus for carrying out the method of this invention is relatively low in cost, easy to operate and durable and can therefore be utilized by a farmer, so that inherent problems of pre-storage, transportation and after-storage are overcome. The majority of the operation of the apparatus can also be accomplished by automatic controls so that only a minimum amount of supervision of the apparatus during operation is required.

It will also be appreciated that, although only the roasting of soybeans has been detailed, this invention can also be used for heat treating other types of particulated organic material, the only modifications required being possibly the adjustment of the temperature controls for the preheating and roasting heaters.

DESCRIPTION OF THE PREFERRED EMBODIMENT

Figure 1:
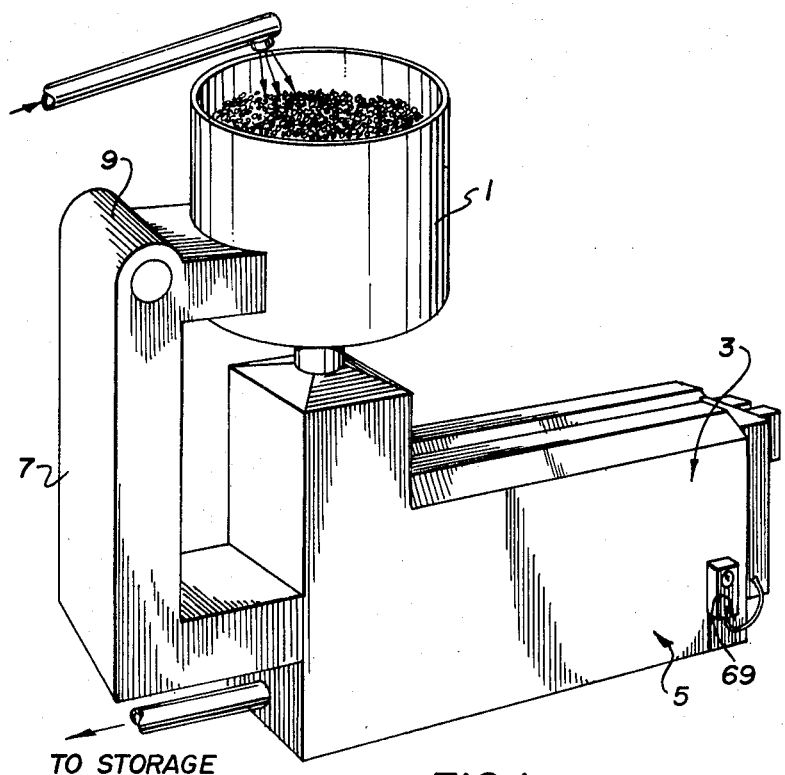
FIG. 1 is a perspective schematic view of a preferred embodiment of the roasting apparatus of this invention.
Figure 3:
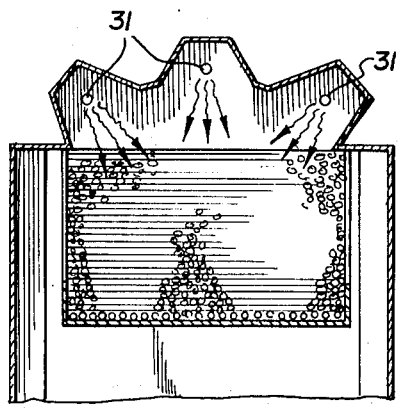
FIG. 3 is a part cross sectional view on 3—3 of FIG. 2.
Figure 2:
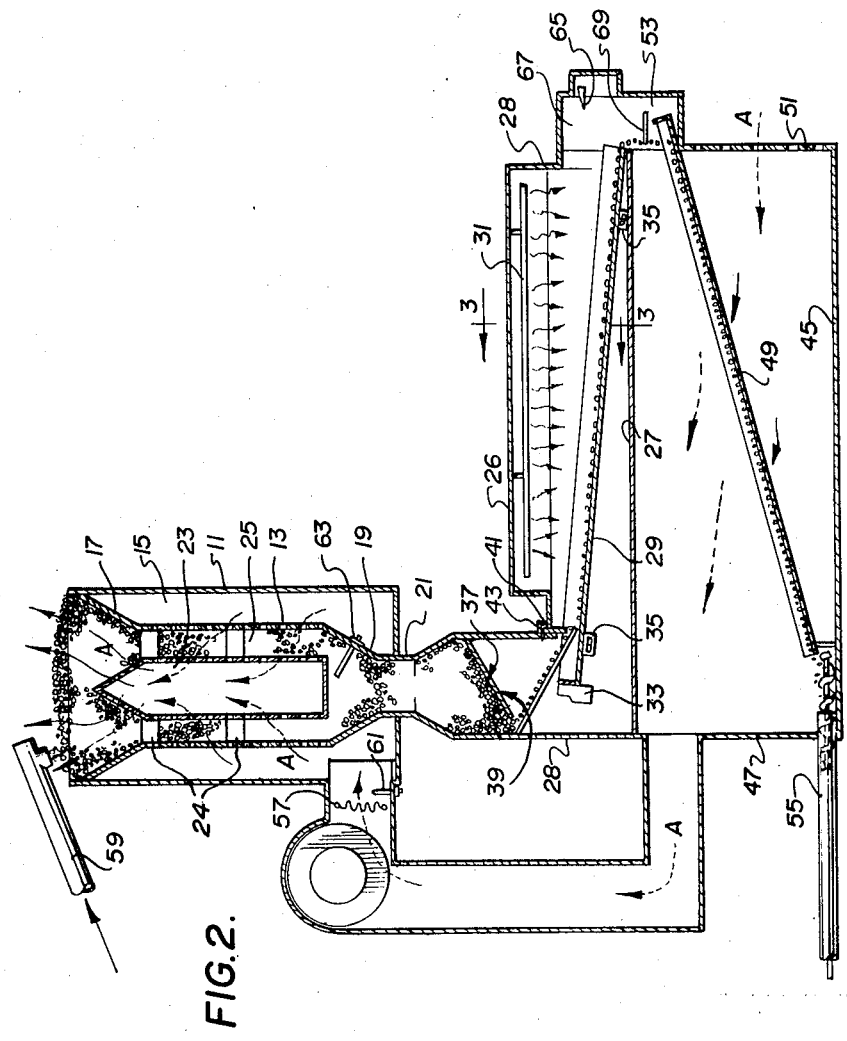
FIG. 2 is a schematic cross sectional view of the apparatus of FIG. 1.
Figure 4:
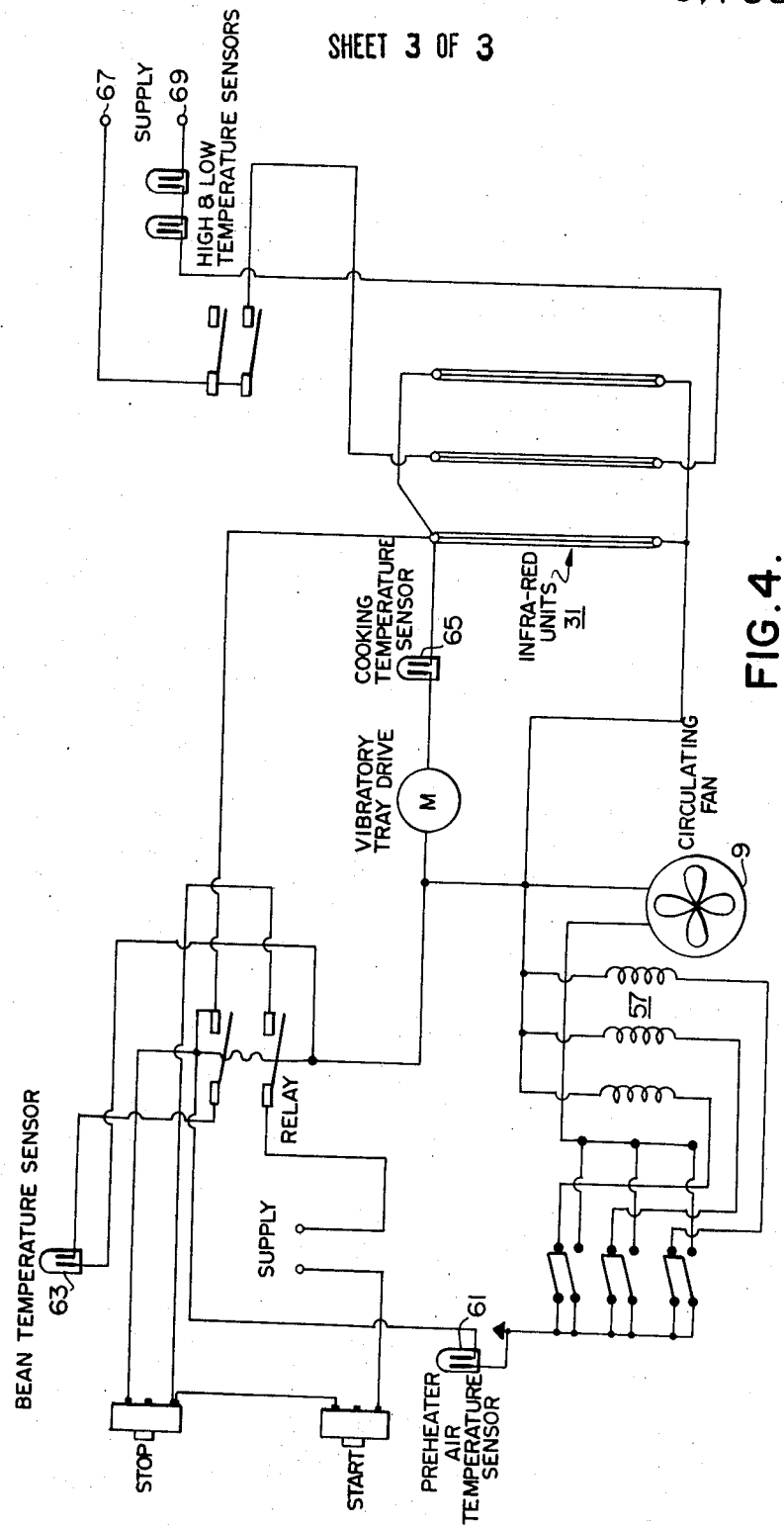
FIG. 4 is a circuit diagram of the electrical components of this invention.

Referring to FIGS. 1, 2, 3 and 4 the roasting apparatus consists of a preheating chamber 1, a roasting chamber 3, a cooling chamber 5, an air circulating duct 7, and a circulating fan 9.

The preheating chamber 1 consists of a hollow cylinder 11 preferably made from sheet steel and an inner perforated container 13. The inner perforated container is shaped and so secured inside the cylinder 11 so that an annular space 15 is formed between the container and the cylinder. The upper end of the perforated container 13 is joined by a frusto-conical shaped sheet 17 to the cylinder 11 while the lower end of the perforated container 13 is secured through a frusto-conical shaped sheet 19 and an outlet pipe 21 to the base of the cylinder 11. An inner perforated cylinder 23 is secured by sheet metal supports 24 welded or otherwise secured between cylinder 23 and container 13. Cylinder 23 is secured along the axis of the cylinder 11 to form an annular space 25 between the inner cylinder 23 and the perforated container 13.

The roasting chamber 3 has a top 26, a base 27 and sides 28. An inclined perforated tray 29 is secured in the chamber 3 and infrared heating units 31 (Canadian General Electric OK9-48 or the like) are positioned above the vibratory tray 29. A vibrator 33 is secured by means not shown to the roasting chamber 3 and the vibratory tray 29 is supported upon sliding brackets 35 which are also secured by any well known manner to the roasting chamber 3. Alternatively, the vibratory tray 29 can be supported upon resilient mountings, from hangers, or by any other well known type of structure. The vibratory tray 29 could also be horizontal with the periodic time of vibrations in the direction required for forward motion being greater than that in reverse direction. A receiving hopper 37 connects the outlet pipe 21 to the roasting chamber 3 and has an inclined plate 39 near its base for feeding a controlled supply of soybeans into the roasting chamber 3. A vertically slidable plate 41 is secured by bolts 43 to the base of the hopper 37 for providing adjustment to control the feeding of soybeans to a single layer.

The cooling chamber 5 has a base 45, side walls 47 and a top which can conveniently be the same member as the base 27 of the roasting chamber 3. An inclined perforated trough 49 is supported inside the cooling chamber 5 and an end wall 51 is perforated or has a perforated opening to permit the entry of air. A transfer box 53 permits transfer of beans from the outlet end of the vibratory tray 29 to the inlet end of the perforated trough 49. A screw conveyor 55 can be utilized to remove roasted soybeans from the exit end of the perforated tray 49 and transport them to a storage container (not shown).

The circulation duct 7 is in communication with the cooling chamber 5 and leads air to the circulating fan 9 which then forces the air through an electric heater 57 to annular space 15.

A screw conveyor 59 can b3 used to transport raw soybeans from a storage container to the preheating container.

A screw conveyor 59 can be used to transport raw soybeans from a storage container to the preheating container.

The method of operating the apparatus is as follows:

Raw soybeans are fed into the preheating container 1 and the lowermost soybeans will flow past the inclined plate 39 and the plate 41 so that the lowermost soybeans will close off the entrance to the vibratory tray 29 and so prevent the flow of soybeans from the preheating chamber 1 through the hopper 37. The fan 9 is operated together with heater 57 so that air will be drawn through the apparatus as shown by the broken arrows A. A temperature sensing bulb 61 (Honeywell T675 or General Electric 6A426) controls the amount of preheating of the air. The preheated air then flows through the raw soybeans and out through the top of the preheating chamber 1. A temperature sensing bulb 63, similar to bulb 61, senses the temperature of the heated raw soybeans and the infrared radiant heaters 31 are switched on when the raw soybeans have attained a certain temperature. When the surface temperature of the infrared heaters reaches a predetermined level, the vibratory tray 29 is activated by temperature sensor 65, similar to bulb 61, and raw soybeans are vibrated down tray 29 to be roasted. The roasted soybeans then are collected and transported down the perforated trough 49 where they are cooled by incoming air for the preheating container 1. The roasted soybeans are then removed by screw conveyor 55 to a storage container.

For satisfactory operation of the apparatus, the following conditions are preferred.

The volume of the preheater container should permit approximately 1 hour of operation without being refilled. For three infrared heating elements 4 feet long, it has been found that the volume of the preheater container should be adequate to contain 350 pounds of raw soybeans. The heater 57 should be approximately 15 kilowatts and preheat the air up to 180°F. as controlled by the temperature sensor 61. The temperature of the raw soybeans should be raised to approximately 140°F. and at this temperature, the temperature sensor 63 will switch on the infrared heating units 31. When the infrared heating units reach a surface temperature of approximately 1,500°F., a temperature sensor 65 set at 180°F. activates the vibratory tray 29. The infrared heating units operate in a controlled range by on and off cycling of the center unit between the limits of 240°F. and 280°F. controlled by low and high limit temperature sensing controls 67 and 69 (Honeywell T675 or General Electric 6A426). These controls are all shown in a schematic form with electrical circuitry being shown in FIG. 4, however, it is understood that any well known type of control circuit can be utilized between the controls and the various switches and motors operating the apparatus.

In order for the operator to determine if the correct amount of heat is being supplied to the soybeans during the roasting, the operator can make the following simple test.

A roasted soybean is ground or pulverized with a blunt object, 55 cc of water are added to the ground soybean together with one drop of a coloring agent having a range of from 7.5 to 8 pH, and 10 grams of urea. The mixture is now stirred and if there is any change in coloring within five minutes the soybean has not been properly heated. The degree of coloring, light or dark, can determine the amount of heat still to be applied. This simple test shows the change in the urease. As ammonia is formed and dissolved in the water only below a pH of 9; above a pH of 9 the ammonia is liberated as a gas and can be detected by smell. Any ammonia smell therefore indicates that more roasting is required. To change the length of time of roasting, the discharge end of the vibratory tray 29 can be raised or lowered by having the lower supporting bracket 35 mounted upon a vertically adjustable mechanism. This mechanism is not shown, however, any type of well known vertically movable support mechanism can be used. Alternatively, the heating elements in the infrared units 31 can be changed for elements of a different length to achieve more heating capacity without raising the roasting temperature.

We claim:

1. An apparatus for heat treating particulated organic material consisting of a preheating chamber, and a roasting chamber and a connection placing said preheating chamber in communication with said roasting chamber: the preheating chamber including a hot air inlet, a preheating container in communication with the hot air inlet, a material inlet to the container and a material outlet from the container, and the roasting chamber including a vibratory tray and electric radiant infrared heating elements above the tray for roasting said organic materials said preheating chamber and said roasting chamber being disposed so that preheated material can flow from said material outlet along said tray while being roasted.

2. The apparatus of claim 1, including a cooling chamber connected to the roasting chamber, the cooling chamber having a trough which collects roasted material from the roasting chamber and conducts it to an outlet, and a cool air inlet and warm air outlet for passing air around the roasted material.

3. The apparatus of claim 1, wherein said preheating chamber is connected to said roasting chamber through a pipe and hopper, said hopper having a variable aperture which can be adjusted so that a single layer of the particulated material will be formed on the vibratory tray during operation.

4. The apparatus of claim 2, wherein the warm air outlet from the cooling chamber is connected through a duct to the hot air inlet to the preheating chamber, and a fan and a heater are situated in the duct for drawing warm air from the cooling chamber, heating the warm air and forcing the heated air into the hot air inlet of the preheating chamber.

5. The apparatus of claim 2, wherein said trough is perforated.

6. The apparatus of claim 1, wherein said preheating container is perforated and formed with an axially positioned perforated member which creates a void in the container to assist the flow of hot air through the material.

7. The apparatus of claim 4 including temperature sensing and control means for controlling operation of the heater, the vibratory tray and the heating elements.

8. The apparatus of claim 1, wherein said heating elements consist of three electric radiant infrared heaters situated side by side, the two outer heaters being operated continuously depending upon a temperature sensor in the preheating chamber, and the central heater being operated intermittently under control of temperature limiting sensors in the roasting chamber.

* * * * *